United States Patent [19]

Franklin, Jr.

[11] Patent Number: 4,640,460
[45] Date of Patent: Feb. 3, 1987

[54] $CO_2$ SNOW FORMING HEADER WITH TRIPLE POINT FEATURE

[76] Inventor: Paul R. Franklin, Jr., P.O. Box 37978, Jacksonville, Fla. 32236

[21] Appl. No.: 785,019

[22] Filed: Oct. 7, 1985

Related U.S. Application Data

[63] Continuation-in-part of Ser. No. 702,888, Feb. 19, 1985, abandoned.

[51] Int. Cl.$^4$ ................................................. F25J 1/00
[52] U.S. Cl. ................................. 239/2.2; 239/128; 239/545; 239/565; 239/14.2; 62/10; 62/35; 62/384
[58] Field of Search ................. 62/10, 12, 35, 47, 121, 62/384; 239/1, 2 R, 2 S, 14, 128, 135, 543–545, 565

[56] References Cited

U.S. PATENT DOCUMENTS

| | | | |
|---|---|---|---|
| 1,590,195 | 6/1926 | Kerr | 239/543 |
| 1,823,460 | 9/1931 | Methudy | 239/565 X |
| 3,016,949 | 1/1962 | Rabbitt | 239/545 |
| 3,667,242 | 6/1972 | Kilburn | 62/35 X |
| 4,111,362 | 9/1978 | Carter, Jr. | 239/1 |
| 4,145,894 | 3/1979 | Frank et al. | 62/35 X |
| 4,381,649 | 5/1983 | Franklin | 62/47 |

Primary Examiner—Joseph F. Peters, Jr.
Assistant Examiner—Mary Beth O. Jones
Attorney, Agent, or Firm—Harvey B. Jacobson

[57] ABSTRACT

A pair of $CO_2$ snow forming nozzles are provided within a tank for receiving $CO_2$ snow and the nozzles are mounted in an upper portion of the tank with their outlet ends directly opposing each other and spaced apart approximately 12½ inches. A supply of liquid $CO_2$ at approximately 300 psi is communicated with the inlet ends of the nozzles for simultaneous discharge of $CO_2$ gas from the nozzle outlet ends and opposing impact of the discharges of $CO_2$ from the nozzle outlet ends in an impact area disposed centrally between the nozzle outlet ends. In addition, the liquid $CO_2$ is communicated with the inlet ends of the nozzles through a supply line therefor constructed of good heat transfer material and including an intermediate length portion passing centrally through the area of opposing impact of the discharges of $CO_2$ from the nozzle outlet ends, thereby chilling the supply line to an extent sufficient to reduce the temperature of the liquid $CO_2$ being supplied to the inlet ends of the nozzles to substantially the triple point temperature.

3 Claims, 5 Drawing Figures

$CO_2$ SNOW FORMING HEADER WITH TRIPLE POINT FEATURE

CROSS REFERENCE TO RELATED APPLICATION

This application comprises a continuation-in-part of my U.S. application Ser. No. 702,888, now abandoned, for $CO_2$ Snow Forming Header With Opposing Nozzles, filed Feb. 19, 1985.

BACKGROUND OF THE INVENTION

1. Field of the Invention

The instant invention relates to an improved apparatus and method for forming $CO_2$ snow within a tank provided therefor and to be contained within insulated shipping containers, railway cars, vehicle bodies and even stationary containers. The instant apparatus is somewhat more efficient than the apparatus disclosed in my co-pending U.S. application Ser. No. 702,888 in that the liquid $CO_2$ discharged from opposing nozzles is supplied to the latter through a header pipe disposed midway between and in alignment with the opposing nozzles thereby enabling the liquid $CO_2$ to be chilled substantially to the triple point temperature (approximately minus 69 degrees F.) immediately before the liquid $CO_2$ under pressure is expanded by discharge from the opposing nozzles.

2. Description of Related Art

Various different forms of apparatus heretofore have been provided for forming $CO_2$ snow within a container therefor by the discharging of liquids $CO_2$ under pressure into such a container through conventional snow forming nozzles.

Various different forms of $CO_2$ snow forming devices heretofore have been provided such as those disclosed in U.S. Pat. Nos. 2,475,755, 3,807,187, 4,111,362, 4,367,511, 4,381,649 and 4,462,423. However, these previously known forms of $CO_2$ snow forming devices, for the most part, are not primarily concerned with forming the maximum amount of $CO_2$ snow from a given quantity of liquid $CO_2$.

Further, although my prior U.S. Pat. No. 4,381,649 discloses a means by which liquid $CO_2$ to be discharged under pressure from snow forming nozzles is chilled to approximately the triple point temperature, the means by which this previous chilling of the liquid $CO_2$ immediately prior to its expansion by being discharged from snow forming nozzles is cumbersome and requires the use of an eutectic solution within a tank of considerable volume.

Under substantially ideal conditions it is generally accepted that the formation of an amount of $CO_2$ snow equivalent to 46% of the weight of liquid $CO_2$ utilized to form that snow is the maximum amount of snow that may be formed from a given quantity of liquid $CO_2$. Accordingly, a need exists for a means by which the forming of $CO_2$ snow is rendered more effective so that a higher percentage in weight of $CO_2$ snow for a given weight quantity of liquid $CO_2$ used to form that snow may be obtained.

SUMMARY OF THE INVENTION

The $CO_2$ snow forming header of the instant invention utilizes an apparatus by which $CO_2$ snow can be produced with the weight of the snow equalling more than 54% of the weight of the liquid $CO_2$ utilized to form that snow. This actually represents an increase of greater than 17% in the weight of $CO_2$ snow being formed from a given quantity of liquid $CO_2$. Accordingly, considerable savings in materials as well as time can be realized through the utilization of the instant invention.

The use of liquified carbon dioxide for refrigerating shipping containers is generally limited to containers in which cooling or moderately low freezing temperatures are required and the liquified carbon dioxide is, in most cases, utilized to form carbon dioxide snow which is approximately minus 69 degrees F. at the triple point temperature of 75 pounds per square inch absolute, but which drops from minus 69 degrees F. to minus 109 degrees F. at atmospheric pressure. Further, $CO_2$ snow is conventionally formed by discharging chilled liquid carbon dioxide from spray nozzles. In such instance, the liquid carbon dioxide is supplied to the spray nozzles at approximately zero degrees F. with the result that one pound of liquid carbon dioxide will yield approximately 0.40 to 0.45 pounds of carbon dioxide snow. However, if the temperature of the liquid carbon dioxide can be maintained at the triple point temperature, one pound of liquid carbon dioxide will yield approximately 0.46 to 0.51 pounds of carbon dioxide snow. Further, it has been found that if, instead of merely discharging liquified carbon dioxide from snow forming nozzles into the ambient atmosphere or onto a chilled surface, a pair of nozzles are disposed in spaced opposing relation and have liquid $CO_2$ supplied thereto at approximately 300 psi, the simultaneous discharge of liquified $CO_2$ from the nozzles, each toward the other with the spacing between the outlet ends of the nozzles being approximately 12½ inches the production of $CO_2$ snow from a given quantity of liquified $CO_2$ is even further increased.

The main object of this invention is to provide an improved method of more efficiently producing carbon dioxide snow for cooling the interiors of insulated containers.

Another object of this invention is to provide a method and apparatus in accordance with the immediately preceding object and wherein the structure required to carry out the method is maintained extremely simple and thus quite inexpensive.

A still further object of this invention is to provide a method and apparatus for converting liquid carbon dioxide to carbon dioxide snow wherein the production of the desired amount of carbon dioxide snow may be accomplished at a rapid rate.

Another object of this invention is to provide a $CO_2$ snow forming apparatus which will be capable of forming a quantity of $CO_2$ having a weight value considerably greater than 50% of the weight value of the liquid $CO_2$ used to form that snow.

A final object of this invention to be specifically enumerated herein is to provide a method and apparatus in accordance with the preceding objects and which will conform to conventional forms of manufacture, be of simple construction and easy to use so as to provide a method and apparatus which will be economically feasible and extremely dependable.

These together with other objects and advantages which will become subsequently apparent reside in the details of construction and operation as more fully hereinafter described and claimed, reference being had to the accompanying drawings forming a part thereof, wherein like numerals refer to like parts throughout.

DESCRIPTION OF THE PREFERRED EMBODIMENTS

Figure 1:
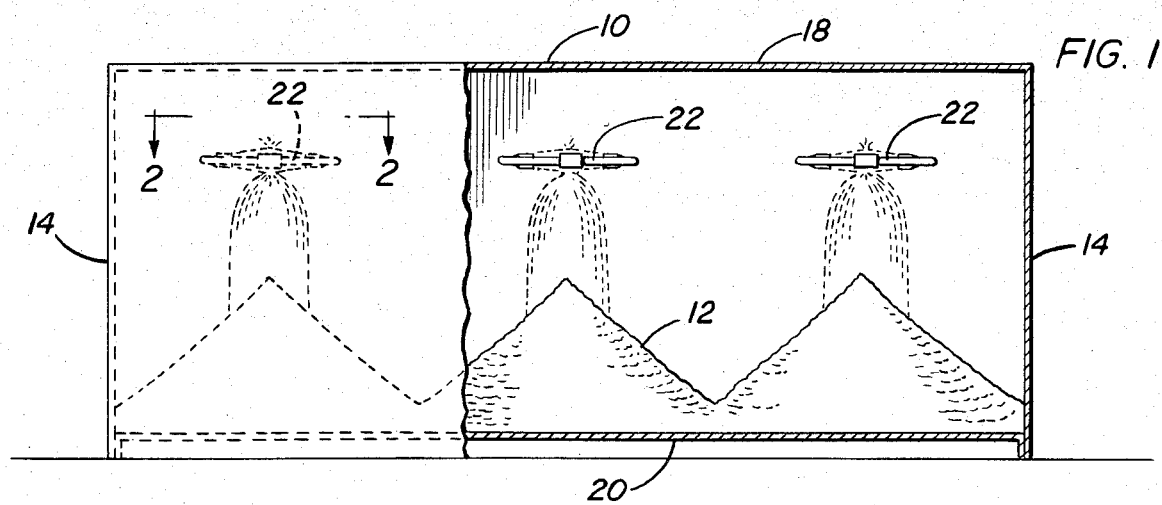
FIG. 1 is a side elevational view of a tank in which liquid $CO_2$ is discharged under pressure through snow forming nozzles in order to form $CO_2$ snow within the tank and with portions of the tank being broken away and illustrated in vertical section.

With reference now more specifically to the drawings, the numeral 10 generally designates a vented substantially closed tank constructed of good heat conducting material and in which liquid $CO_2$ snow 12 is to be formed. The tank 10 includes opposite end walls 14 and opposite side walls 16 as well as top and bottom walls 18 and 20. The top wall 18, one of the side walls 16 or portions of the side walls 16 may be removed in order to gain access to the interior of the tank for maintenance purposes, should maintenance become necessary.

The tank 10 includes three horizontal U-shaped manifolds 22 mounted therein and each of the manifolds 22 includes a pair of opposite side tubes 24 and 26 interconnected at one pair of corresponding ends by an end tube extending therebetween and communicating therewith. The end tube 28 includes a T-fitting 30 connected therein and a supply pipe 32 has its discharge end supported from an opening into the T-fitting 30, the inlet end of the supply pipe 32 having the discharge end of a supply hose 34 removably coupled thereto. The inlet end of the supply hose 34 is suitably connected to a valved discharge (not shown) of a suitable supply of liquid $CO_2$ under pressure.

Figure 2:
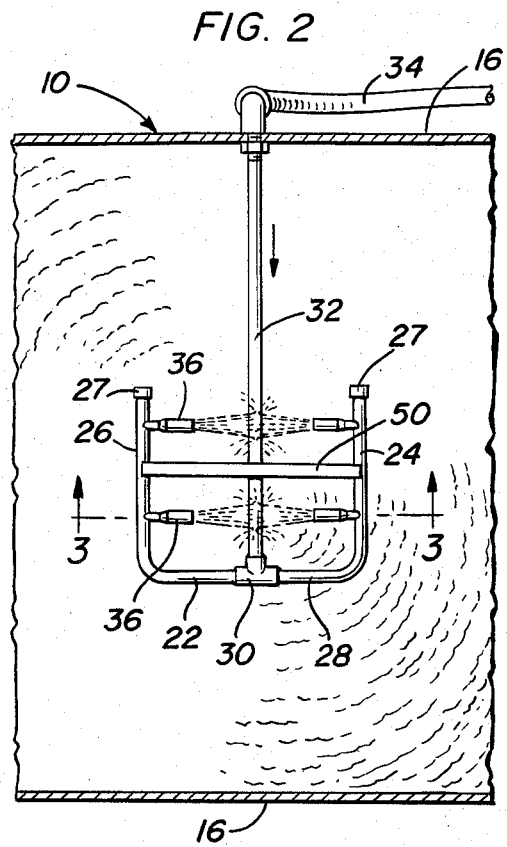
FIG. 2 is an enlarged fragmentary horizontal sectional view taken substantially upon the plane indicated by the section line 2—2 of FIG. 1.
Figure 4:
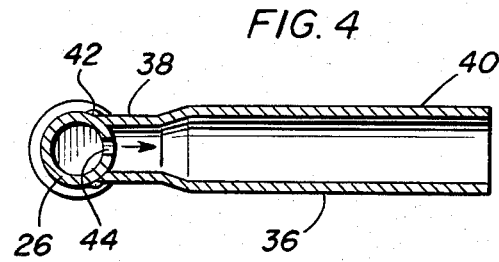
FIG. 4 is an enlarged vertical sectional view illustrating the type of nozzle by which liquid $CO_2$ is discharged in order to form $CO_2$ snow.

From FIGS. 2 and 4 of the drawings it may be seen that each of the tubes 24 and 26 includes a pair of tubular nozzles 36 spaced longitudinally therealong. Each of the nozzles 36 includes a diametrically reduced inlet end 38 and a larger diameter outlet end 40. The inlet ends 38 are contoured to abut against the side of the corresponding pipe and are secured thereto in any convenient manner such as by welding 42. In addition, each of the pipes 24 and 26 includes a small diameter outlet port 44 formed therein opening into the inlet end 38 of the corresponding nozzle 36. The inlet ends 38 are approximately ⅜ inch in diameter and ¾ inch long and the outlet ends are ¾ inch in diameter and approximately 4 inches long. Further, the outlet ports 44 are approximately 5/32 inch in diameter. Also, it will be noted from FIGS. 2 and 3 of the drawings that corresponding nozzles 36 carried by the pipes 24 and 26 are aligned with and directly oppose each other, the spacing between the opposing outlet ends 40 being approximately 12½ inches.

The nozzles 36 are operative to form the $CO_2$ snow 12 within the tank 10 as liquid $CO_2$ is supplied to the manifold 22 under pressure from the supply hose 34 and the supply pipe 32. The liquid $CO_2$ is discharged into the nozzles 36 through the outlet ports 44. The liquid $CO_2$ is supplied to the hose 34 at approximately 300 psi and the discharge of $CO_2$ through the opposing outlet ports 44 and nozzles 36 results in the spray jets 46 from the nozzles 36, see FIG. 3, directly opposing each other.

However, the supply pipe 32 extends along a straight path connecting the points at which the spray discharges from the nozzles 36 impinge with each other. Accordingly, the $CO_2$ snow being formed as a result of operation of nozzles 36 not only impinges with the snow being discharged from the opposite nozzles but also impinges upon the discharge end of the supply pipe 32. Thus, the liquid $CO_2$ passing through the supply pipe 32 is chilled to approximately the triple point temperature of the liquid $CO_2$ at 300 psi, the size of the ports 44 and the number of pairs of nozzles 36 disposed along the supply pipe 32 as well as the pressure of the liquid $CO_2$ passing through the supply pipe 32 and thus supplied to the ports 44 all functioning together to accomplish the desired chilling of the liquid $CO_2$ within the supply pipe 32 to approximately the triple point temperature of the liquid $CO_2$ therein at 300 psi.

Figure 3:
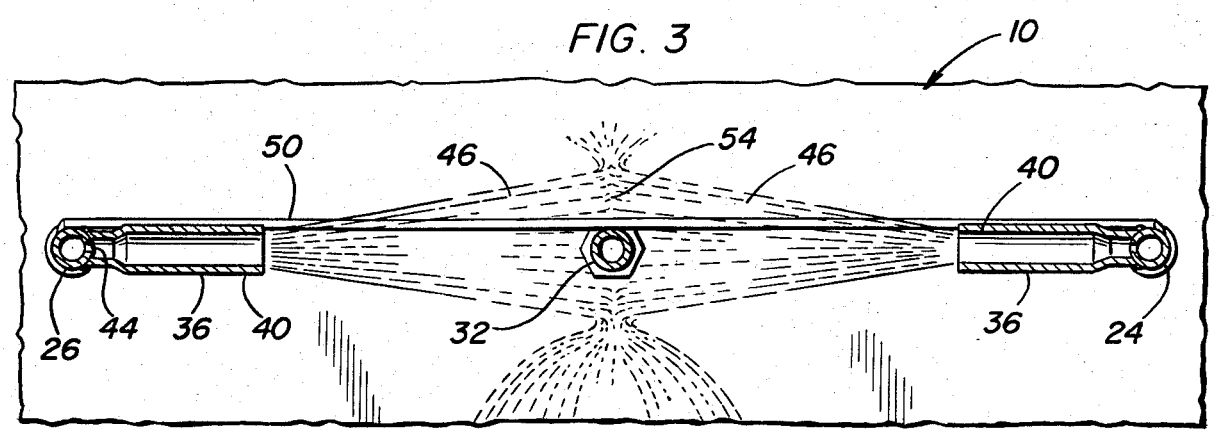
FIG. 3 is an enlarged fragmentary vertical sectional view taken substantially upon the plane indicated by the section line 3—3 of FIG. 2.

While some of the expansion of the liquid $CO_2$ from the nozzles results in a small portion of the liquid $CO_2$ being directly transformed into $CO_2$ gas, by discharging the jets 46 not only directly toward each other in the manner illustrated in FIG. 3 but also upon the supply pipe 32 and with the nozzles spaced approximately 12½ inches apart, less of the liquid $CO_2$ is transformed directly into $CO_2$ gas with the result that the $CO_2$ snow 12 formed within the tank has a weight equal to more than 54% of the weight of the liquid $CO_2$ utilized to form the snow. Actually, by using the arrangement of the instant invention more than 54% of the weight of the liquid $CO_2$ used is transformed into snow, whereas conventional methods of forming $CO_2$ snow result in the snow being formed weighing approximately only 46% of the weight of the liquid $CO_2$ utilized to form that snow. This of course translates into a greater than 17% increase in the amount of $CO_2$ snow which may be formed from a given amount of liquid $CO_2$.

Figure 5:
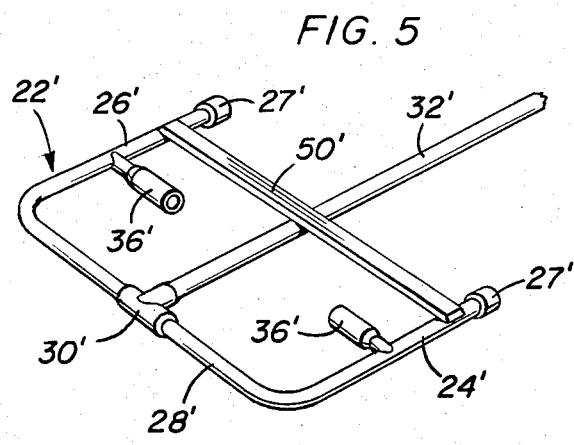
FIG. 5 is a fragmentary perspective view of a modified form of manifold assembly by which liquid $CO_2$ may be utilized to produce $CO_2$ snow in accordance with the present invention.

With attention now invited more specifically to FIG. 5 of the drawings, there may be seen a modified form of manifold referred to in general by the reference numeral 22' and which is generally U-shaped in configuration and includes a pair of tubular legs 24' and 26' corresponding to the tubes 24 and 26. The ends of the legs 24' and 26' remote from the end tube 28' corresponding to the end tube 28 are capped as at 27', the tubes 24 and 26 being capped as at 27.

Only one pair of nozzles 36' are supported from the legs 24' and 26' and discharge end of the supply of pipe 32' corresponding to the supply pipe 32 opens into a T-fitting 30' corresponding to the T-fitting 30. Therefore, it may be seen that the manifold 22' is substantially identical to the manifold 22, except that the manifold 22' includes only one pair of nozzles 36' as opposed to two pairs of nozzles 36.

With attention again invited to FIGS. 2 and 3, it may be seen that the mid-portions of the tubes 24 and 26 disposed between the corresponding nozzles 36 have a brace 50 extending and secured therebetween. The brace 50 as well as a similar brace 50' shown in FIG. 5, is needed to prevent the jet action of the high pressure discharge of liquid $CO_2$ through the ports 44 from generating sufficient thrust to spread the free end portions of the tubes 24 and 26 apart and the nozzles 36 to be shifted out of direct opposing relation with each other.

From FIG. 3 of the drawings it may be seen that the spray jets 46 from the outlet ends 40 impact in opposing relation in an area 54 spaced centrally between the outlet ends 40 and that the supply of pipe 32 includes an intermediate length portion thereof passing centrally through the area 54.

Accordingly, not only is an increase in the $CO_2$ snow produced realized by the directly opposing impacting of the discharges 46 in the area 54 but also by the cooling of the intermediate portion of the supply of pipe 32 which passes centrally through the area 54, this cooling of the intermediate portion of the supply of pipe 32 serving to chill the liquid $CO_2$ passing through the supply of pipe 32 to substantially the triple point temperature of liquid $CO_2$ at 300 psi.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A $CO_2$ snow forming system for forming a maximum amount of $CO_2$ snow from a given quantity of pressurized liquid $CO_2$, said system including a pair of snow forming nozzles including inlet and outlet ends, support means supporting said nozzles in spaced apart relation with said outlet ends opposing and aligned with each other, and pressurized liquid $CO_2$ supply means communicated with said inlet ends for simultaneously supplying pressurized liquid $CO_2$ to said inlet ends for simultaneous discharge of $CO_2$ from the outlet ends of said nozzles and opposing impact of the spray jets of $CO_2$ from said outlet ends, said supply means including a supply pipe having an intermediate length portion thereof registered with and disposed centrally intermediate said outlet ends, whereby the jet discharges from said nozzles not only impinge against each other, but also upon said supply pipe intermediate length portion for chilling the liquid $CO_2$ passing therethrough at least generally to the triple point temperature thereof, said supply means including means operative to supply liquid $CO_2$ to said supply pipe at approximately 300 psi, said outlet ends being spaced approximately $12\frac{1}{2}$ inches apart.

2. The system of claim 1 wherein said support means includes tubular manifold means from which said nozzles are supported and into which said inlet ends open, said supply pipe including an outlet end opening into said manifold means.

3. The method of forming maximum $CO_2$ snow in a vented receptacle for $CO_2$ snow comprising the steps of providing a pair of substantially equal rate discharge $CO_2$ snow forming nozzles including inlet and outlet ends, supporting said nozzles in spaced apart relation with said outlet ends opposing and aligned with each other, and simultaneously supplying liquid $CO_2$ under pressure to said inlet ends through a supply pipe for simultaneous discharge of $CO_2$ from the outlet ends of said nozzles and opposing impact of the discharge of $CO_2$ from said outlet ends in an impact area centrally between said nozzles and with an intermediate length portion of said supply pipe passing centrally through said impact area, supplying pressurized liquid $CO_2$ to said inlet ends at approximately 300 psi, said step of supporting said nozzles in spaced apart relation including supporting said nozzles with the outlet ends thereof spaced approximately $12\frac{1}{2}$ inches apart.

* * * * *